UNITED STATES PATENT OFFICE.

ROBERT M. LETCHFORD AND WILLIAM B. NATION, OF THREE-COLTS LANE, BETHNAL-GREEN, ENGLAND.

IMPROVEMENT IN THE TREATMENT AND PURIFICATION OF PARAFFINE.

Specification forming part of Letters Patent No. 133,042, dated November 12, 1872.

*To all whom it may concern:*

Be it known that we, ROBERT MICHAEL LETCHFORD, chemist, and WILLIAM BRYER NATION, paraffine-refiner, both of Three-Colts Lane, Bethnal-Green, in the county of Middlesex, England, have invented or discovered new and useful Improvements in the Treatment of Paraffine; and we, the said ROBERT MICHAEL LETCHFORD and WILLIAM BRYER NATION, do hereby declare the nature of the said invention, and in what manner the same is to be performed, to be particularly described and ascertained in and by the following statement thereof—that is to say:

This invention has for its object improvements in the treatment of paraffine. Several years ago a process for the purification of paraffine was invented and published by one of us—viz., by WILLIAM BRYER NATION—and it was patented in Great Britain on the 1st day of February, 1866. Our present invention is an improvement on the process thus already published, and which was as follows: The paraffine to be purified was melted and then stirred or agitated with cold water. The temperature was thus reduced carefully to a point from two to six degrees below the melting-point of the material. The purer portion of the paraffine, and that which has the higher melting-point, was in this way caused to solidify, while a residue remained liquid. To separate the finely-divided solid paraffine thus obtained from the water and the liquid paraffine intimately mixed with it, it was proposed to allow the whole to stand for a time, until the materials separated into layers, according to their specific gravities. In this last stage, however, the process is defective, the separation into layers is very imperfect, and the process has to be repeated a great number of times. Now, according to our present invention, we also treat paraffine with water in order to separate the harder paraffine from the impurities and the softer and more easily melted parts; and we also carefully regulate the temperature at which the process is conducted so as to be slightly below the melting-point of the material. But the essential difference between our present method of treating paraffine, and that which has already been published is, that we now avoid the minute division of the material which results from cooling it during agitation with water, and which renders it very difficult and impossible thoroughly afterward to separate the particles of hard and pure paraffine, which have become solid from the softer and more impure paraffine with which it is thus intimately intermixed. We now take the paraffine, in pieces of any size which can be conveniently handled and retained, and from such pieces we wash out or separate, by hot water, the softer, more easily melting, and more impure parts. Such parts float away with the water and leave the solid pieces of paraffine harder and more pure. If extreme whiteness be required, we keep the paraffine melted for some hours while in contact with commercial ivory-black. We prefer to conduct the process in the following manner:

We provide a tank—say about twelve feet by six feet, and two and one-half feet deep—divided by cross-partitions into V-form cells two and one-half inches wide at the top and two inches at the bottom. The cells are open at the bottom, as the partitions stop short at two inches from the bottom of the tank. Their upper ends are nine inches from the top of tank. There is a space of about one inch between cell and cell. There is a perforated lid or grating to fit into the tank, resting on the top of the partitions. A grating with bars one and one-half inch apart is suitable. We fit steam-pipes (free or closed) into the tank below the partitions. In using this apparatus, we run water into the tank to the depth of six inches, and fill crude paraffine into the cells of the tank, and then secure the lid or grating, to prevent the paraffine floating. We run more water into the tank to within two inches of the top, and turn on steam until the temperature of the water is about 10° Fahrenheit of the setting-point of the paraffine under manipulation; then we shut off the steam to allow the heat time to permeate the material. In about one hour we increase the temperature, raising it gradually for about four hours to within two degrees of the setting-point of the paraffine that was put into the tank. Then we shut off the steam and take off the soft portions which have floated to the surface of the water. This being done, we run the water off to the top of the divisions, then melt the remaining paraffine in its cells, and let it stand to cool all night. In the morning, the steam may be turned on again, to perform the operation a second time, and we repeat the process as often as necessary to obtain the purity and hardness required. It is rarely necessary to do so more than four times; or the process may be conducted by first melting the paraffine in the cells and then cooling to two degrees below the setting-point of the material. We then secure the lid, add more water, and float out the soft portions. In either way, we finally remove the lid and take out the paraffine from which the low-melting portions have been extracted. The low-melting portions which have been removed are to be again treated like the crude.

For obtaining fine degrees of whiteness, when the foregoing operations have been carried far enough, we remove the clean paraffine to a steam-jacketed pan, adding thereto about seven per cent. of commercial ivory-black, in powder, and keep it melted for four or five hours, until the whole of the ivory-black is precipitated. We then cast it into cakes in the usual way. The ivory-black may afterward be used advantageously in making blacking.

Paraffine of all kinds, whether obtained from coal, schist, ozocerite, or other source, may be treated according to this invention.

Having thus described the nature of our said invention, and the manner of performing the same, we would have it understood that we do not confine ourselves to the exact details described; but

We claim—

1. The treatment of paraffine with water in such manner as to wash out or remove the softer, more fusible, and impure parts, leaving the harder and purer paraffine in its original solid form, substantially as described.

2. The method of treating paraffine by mixing it with commercial ivory-black, substantially as described.

R. M. LETCHFORD.
W. B. NATION.

Witnesses:
G. F. WARREN, } Both of No. 17 Grace-
THOS. BROWN, } church Street, London.
JOHN HARRISON,
    Notary Public, London.